United States Patent [19]

Anderson, Jr. et al.

[11] Patent Number: 4,821,772
[45] Date of Patent: Apr. 18, 1989

[54] DUAL ACTIVE SELECTOR VALVE

[75] Inventors: William L. Anderson, Jr.; Larry A. Sample, both of Houston, Tex.

[73] Assignee: Anderson Greenwood & Co., Bellaire, Tex.

[21] Appl. No.: 719,072

[22] Filed: Apr. 2, 1985

Related U.S. Application Data

[63] Continuation-in-part of Ser. No. 667,762, Nov. 2, 1984, abandoned.

[51] Int. Cl.$^4$ .................................. F16K 11/02
[52] U.S. Cl. ....................... 137/625.46; 137/874; 137/876; 137/630.14; 251/96
[58] Field of Search ................ 137/874–876, 137/625.11, 625.46, 630.14; 251/96, 296, 229

[56] References Cited

U.S. PATENT DOCUMENTS

| | | | |
|---|---|---|---|
| 68,682 | 9/1867 | Armstrong | 137/876 |
| 2,720,214 | 10/1955 | Rupp et al. | 137/315 |
| 3,217,735 | 11/1965 | Stalter | 137/329.05 |
| 3,630,231 | 12/1971 | Miller | 137/625.16 |
| 3,911,956 | 10/1975 | LeBreton et al. | 137/625.46 |
| 4,067,359 | 1/1978 | Kwast | 137/630.14 |
| 4,403,626 | 9/1983 | Paul, Jr. | 137/68 R |

FOREIGN PATENT DOCUMENTS 482158 9/1929 Fed. Rep. of Germany ...... 137/876

OTHER PUBLICATIONS

Anderson, Greenwood & Co. brochure describing the "AGCO Safety Selector Valve", ©1983.

Primary Examiner—Samuel Scott
Assistant Examiner—Allen J. Flanigan
Attorney, Agent, or Firm—Gunn & Nichols

[57] ABSTRACT

A dual active selector valve is set forth. In the preferred and illustrated embodiment, a flange supporting a manifold body is attached to a pressure vessel. The passage through the flange has a selected diameter and the manifold body opens out to a larger diameter, sufficient to enable two valves to be connected side by side, having inlet passages equal in diameter to about one half the selected diameter. A rotatable conduit member is mounted within the manifold body having a centrally located pin for rotation, the rotatable portion incorporating separate flow passages selectively connecting to one of the two alternately deployed valves, and also supporting a valve closure plate to plug the passageway into the valve not being used.

27 Claims, 3 Drawing Sheets

DUAL ACTIVE SELECTOR VALVE

RELATED APPLICATIONS

This application is a continuation-in-part application of U.S. Ser. No. 667,762 filed on Nov. 2, 1984.

BACKGROUND OF THE DISCLOSURE

Conventional methods for servicing safety relief valves typically require awkward and expensive piping fabrications or even total shutdown of the system for routine or emergency service of redundant safety relief valves. Some conventional methods require two separate penetrations into the pressure vessel connected with mechanically linked block valves. Other conventional methods incorporate three-way block valves connected to a single penetration into the pressure vessel. The three-way block valve configuration commonly results in high pressure losses. The valve selector manifold of the present disclosure overcomes the disadvantages associated with these conventional methods.

This apparatus is directed to a valve mounting manifold. It is adapted to be attached to a pressure vessel for protection of the vessel against overpressure. It is duplicate valved to enable relief devices to be installed with only a single opening into the pressure vessel thereby reducing the number of openings formed in the pressure vessel. It is axiomatic that openings cut into a pressure vessel, cause problems by increasing complexity, all at an increased cost. This device enables the number of openings cut into a pressure vessel to be reduced. It defines a pressure vessel selector manifold enabling multiple safety relief valves to be installed at a single vessel opening. The valve selector manifold of this disclosure enables one safety valve to be placed in service while a second valve is out of service or even dismounted for maintenance.

The dual active valve selector manifold of this disclosure provides dual connections for relief during flowing conditions. This manifold has smoothly faired flow paths to the selected relief valves and thereby enables the relief valves to be exposed to the pressure of the vessel with minimum pressure loss during flowing conditions.

Pressure vessels typically require one or more safety relief valves for protection of the vessel in the event of overpressure. The selector valve manifold of this disclosure is particularly suitable for use with pressure vessels requiring two safety relief valves in operation to meet the safety standards established for the pressure vessel. The selector manifold of this disclosure is dual active, permitting both safety relief valves to be exposed to the pressure of the pressure vessel simultaneously through a single opening into the pressure vessel.

Periodic maintenance or repairs of the safety relief valves will be required. The valve selector manifold of this disclosure enables field servicing of one relief valve without defeating safety valve protection of the pressure vessel by the second relief valve. For instance, this device mounts duplicate safety relief valves, enabling one to be switched out of service while the other remains operative. Removal of one can be undertaken while the other is operative. This can be accomplished without reducing pressure in the pressure vessel.

SUMMARY OF THE INVENTION

With the foregoing in view, the present apparatus is described in summary fashion as incorporating a flange connector adapted to be joined to a pressure vessel at a flanged opening. The flange encloses a passage of specific diameter. The housing encloses alternative flow paths. The alternate flow paths are selected by rotating a rotor mounted on a central pin for rotation, creating alternate flow paths through the selector valve manifold. The flow paths are routed to a top plate, the top plate having spaced openings to enable similar or identical safety relief valves to be mounted on top of the selector valve manifold. A closure disc mounted on the rotor enables alternate closing of the flow passages permitting maintenance and repair of the relief valves mounted to the selector valve manifold. When maintenance or other service is not required, the rotor is positioned so that both flow passages to the safety relief valves are open.

Many other details will be observed upon review of the description below of the preferred and illustrated embodiment.

BRIEF DESCRIPTION OF THE DRAWINGS

So that the manner in which the above recited features, advantages and objects of the present invention are attained and can be understood in detail, a more particular description of the invention briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENT

Figure 1:
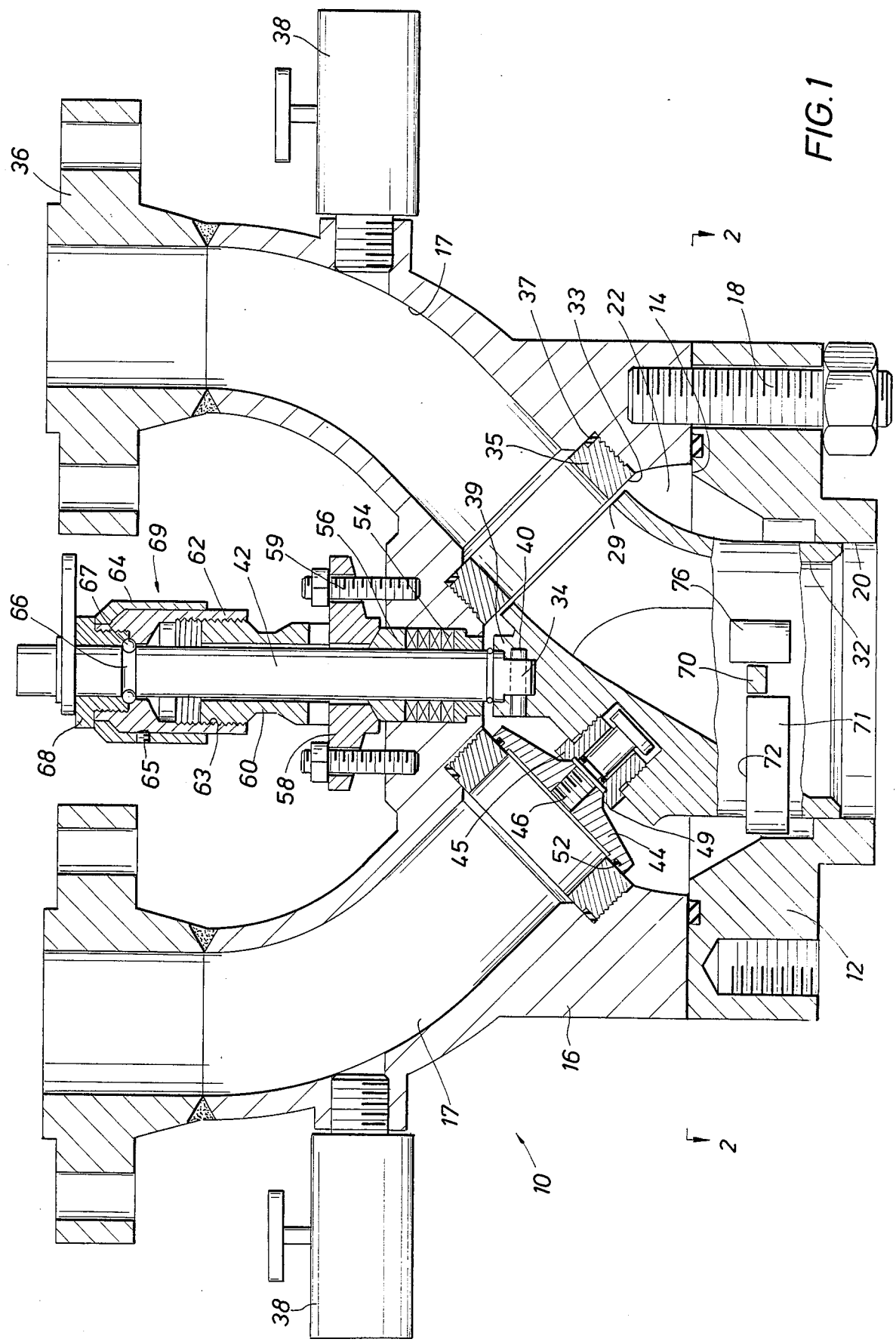
FIG. 1 is a sectional view through the selector valve manifold of the invention showing details of constructions.

In FIG. 1 of the drawings, the numeral 10 identifies the complete assembly which comprises the selector manifold apparatus of this disclosure. The apparatus 10 includes a circular flange body component 12 which will be described as the lower body portion. It terminates at a transverse flat face 14; the flat face 14 being adapted to abut a matching face of an upstanding and encircling upper body component 16. As will be observed, they are joined together by suitable headless bolts 18, and a suitable inlet opening is defined at 20. The inlet opening 20 is adapted to be connected by any suitable means, including a matching flange whereby connection is made to a pressure vessel or the like.

Figure 2:
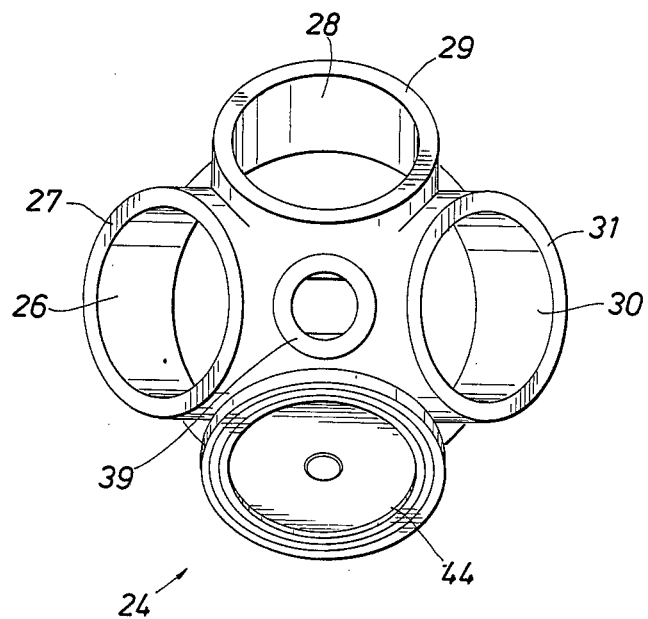
FIG. 2 is a top view of the rotor member of the invention.

Centrally located within the two housing components 12 and 16 is a rotatable component. It is captured within the two housing components and is enclosed in a pressure type chamber 22. More accurately, it is enclosed in the two housing components when assembled so that it operates to divert the flow therethrough along a route to one or both of the safety relief valves. The rotatable component, which for purposes of convenience, will be described as a rotor, is generally identified by the numeral 24, shown in FIG. 2. The rotor 24 is preferably formed as casting and incorporates three curving conduits 26, 28 and 30 therein. The conduits 26, 28 and 30 terminate or merge at the common inlet end 32 of the rotor 24. The inlet end 32 is telescoped adjacent the inlet opening 20 of the lower housing component 12. The inlet 32 has an internal diameter sized to be equal to or larger than the mating outlet in the pressure vessel opening. Moreover, the inlet 32 has an internal diameter which is larger than the internal diameter at the outlet end of the curving conduits 26, 28 and 30 and sized so that there is minimum constriction to fluid flow, thereby obtaining minimum pressure drop between the inlet and outlets of the apparatus 10.

Referring now to FIG. 1, the curved conduit 28 is shown terminating at an outlet end 29. The end 29 is spaced from a circular, axially hollow seat assembly 35. The seat assembly 35 is spaced from the end 29 of the curved conduit 28. The seat assembly 35 has a downwardly directed face 33 for sealing purposes. A fluid tight seal between the seat assembly 35 and the upper housing component 16 is provided by a seal ring 37.

The upper housing 16 includes a curved passage 17. The passage 17 extends upwardly as shown in FIG. 1 where it exposes an open upper end and is conveniently welded to a flanged fitting 36 for connection with a pressure relief valve. The passage 17 may capture fluid under pressure between the relief valve connected at the flanged fitting 36 and the valve seat assembly 35. To this end, the numeral 38 identifies a hand valve which opens into the passage 17. The hand valve 38, when opened, permits trapped pressure in the passage 17 to be released. In addition, the hand valve 38 provides an inlet to the passage 17 testing the relief valve connected at the flanged fitting 36.

As described at this juncture, it will be understood that duplicate equipment is arranged on both the right and left as shown in FIG. 1. That is, there is a similar left seat assembly 35 cooperative with a similar left side passage 17 for convenient connection to a similar safety relief valve. Moreover, the left hand passage is protected by a suitable hand valve 38 permitting access to that passage. Likewise, the curving conduits 26, 28 and 30 are substantially identical curving upwardly and outwardly from the common inlet 32. The curved conduits 26 and 30 terminating at outlet ends 27 and 31, respectively.

The conduits 26, 28 and 30 and the passages 17 form a smooth, gently curving flow passage for directing fluid flow from the pressure vessel outlet to the pressure relief valves connected at the flanged fittings 36. Obstructions or abrupt changes in flow direction are avoided. The curving flow passages permits a smooth change in direction of fluid flow through the apparatus 10 with minimum pressure drop between the inlet and outlets of the apparatus 10.

The rotor 24 is preferably formed as casting, incorporating the curved conduits 26, 28 and 30, and the inlet 32 therein. The rotor 24 also includes an upstanding circular sleeve 39 extending from the upper domed end of the rotor 24. The sleeve 39 defines a blind hole sized to receive the lower end of a rotatable pin 42. A hole through the sleeve 39 enables a bolt 40 to be anchored through the sleeve 39 and to the lower end of the rotatable pin 42. The pin 42 supports a downwardly protruding lug 34 which is perforated to align with the hole in the sleeve 39 for receiving the bolt 40 therethrough. The bolt 40 fastens at a specified elevation to support in a hanging or downwardly depending position the rotor 24. The rotor 24 has a center line axis of rotation defined by the mounting pin 42 and it is axially coincident with the inlet opening at 20 and the inlet 32 of the rotor 24. Accordingly, the rotor 24 rotates to position the curved conduits 26, 28 and 30 in alignment with the passages 17 shown in FIGS. 1 and 3. The curved conduits rotate about the axis defined by the pin 42 so that each curved conduit can be aligned with the left or right passages in the upper housing 16 as desired. A separate construction supports a closure member on the rotor 24. The passages 17 in the upper housing 16 are aligned at approximately 180° on opposite sides from the pin 42. The closure member and the curved conduits 26, 28 and 30 are aligned at 90° spacing about the rotational axis of the rotor 24.

Figure 3:
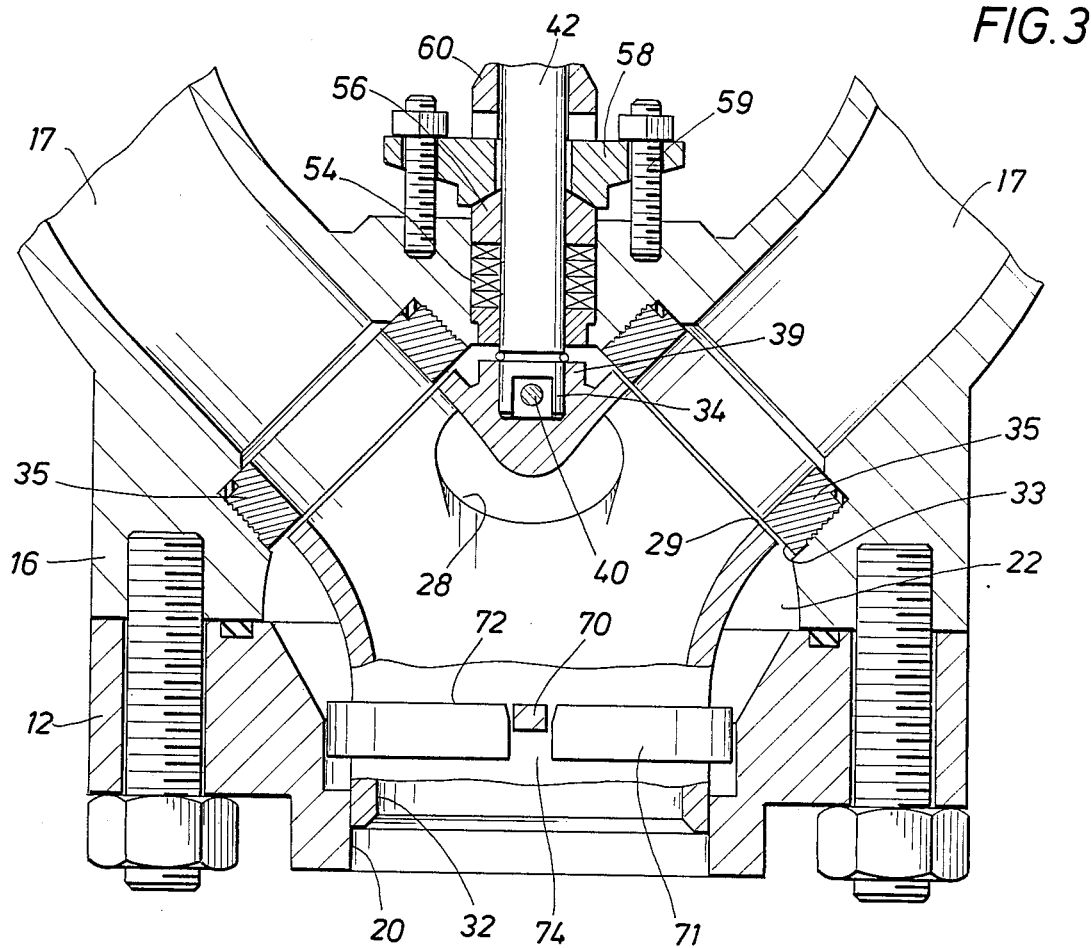
FIG. 3 is a sectional view through the selector valve manifold showing that the both flow paths are open through the manifold.
Figure 5:
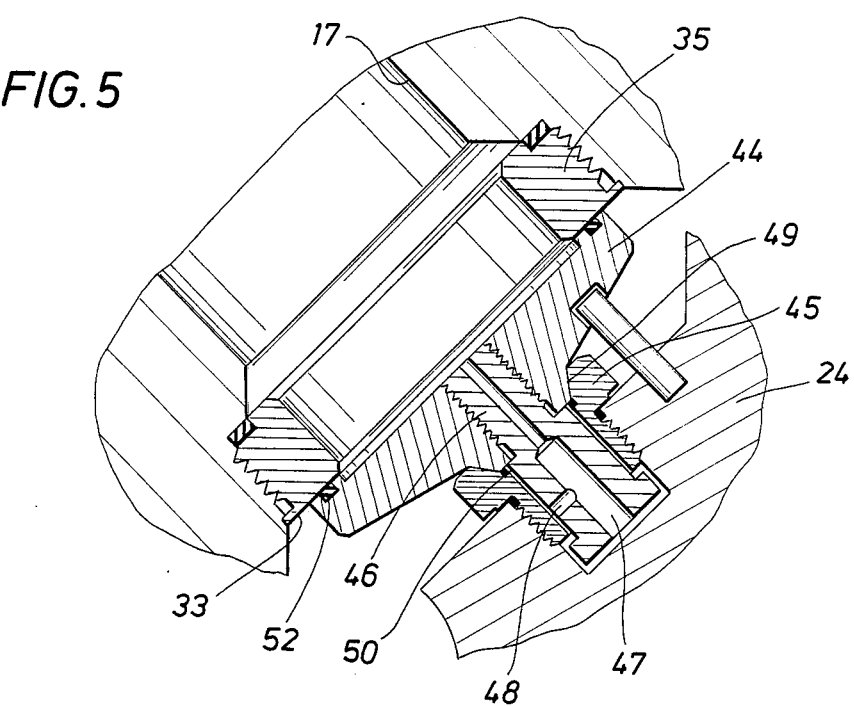
FIG. 5 is a sectional view of the closure disc for selectively closing the flow paths of the selector manifold.
Figure 4:
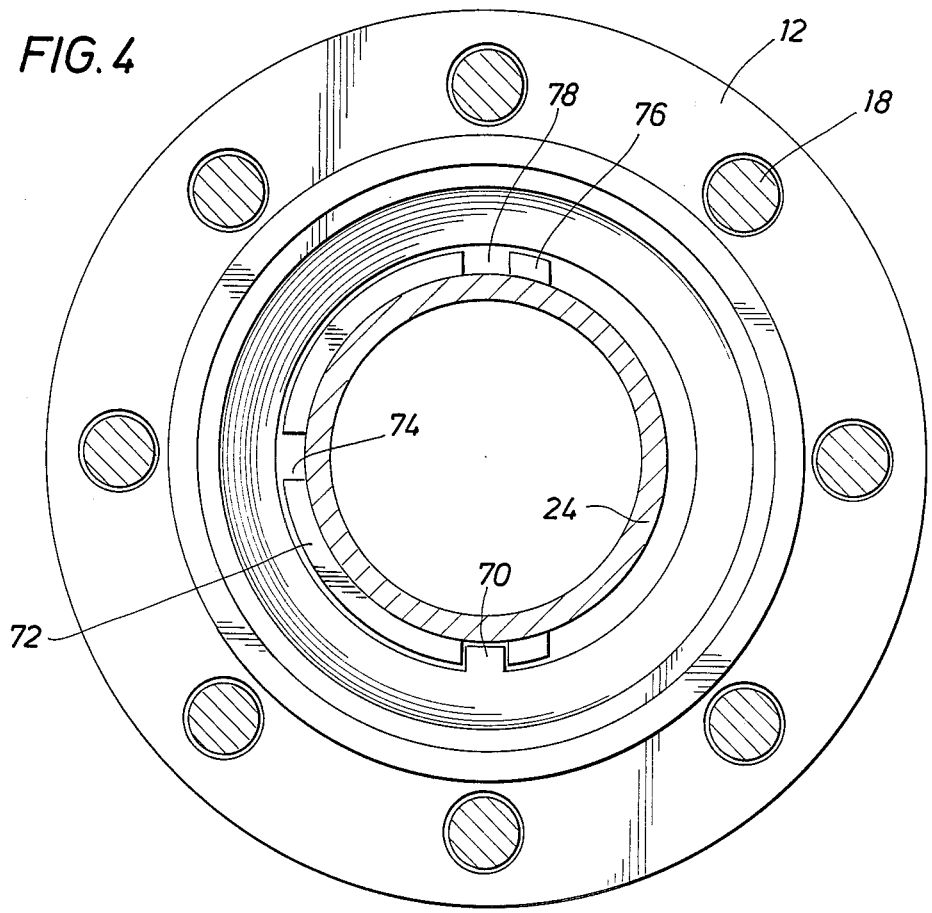
FIG. 4 is a sectional view taken along line 2—2 of FIG. 1.

This kind of arrangement utilizes the rotor 24 to rotate the curved conduits 26, 28 and 30 to a desired alignment as illustrated in FIGS. 1 and 3. Curved conduits 26 and 30 are aligned at 180° spacing permitting fluid flow through both passages 17 upon rotation of the rotor 24 in the position illustrated in FIG. 3. The curved conduit 28 is aligned 180° from the closure disc 44. The closure disc 44 is mounted on a telescoping mounting pin 46. A mounting plug 45 is threaded to the rotor 24, as best shown in FIG. 5, for mounting the closure disc 44 to the rotor 24. The pin 46 extends through the mounting plug 45 and is threaded to the closure disc 44. The pin 46 is axially hollow at 47. It is hollow from the exposed end back to the recessed end as shown in FIG. 5. A lateral passage 48 aids in permitting fluid to flow through the pin 46. The pin 46 is permitted to move relative to the mounting plug 45 so that the closure disc 44 wobbles slightly when not sealed against the face 33 of the seat assembly 35. This permits the closure disc 44 to accommodate for slight misalignment with the seat assembly 35. Upon slight downward movement of the rotor 24, a gap is formed at 49 establishing fluid communication between the interior chamber 22 and the passage 17. The flow path is through the gap at 49 past seal ring 50. The flow path in the vicinity of the pin 46 is directed along the pin 46 through passage 47 and out into the passages 17.

The closure disc 44 incorporates a peripheral seal 52. The seal 52 is included to seal against the face 33 of the seat assembly 35. Assuming a pressure differential acting on the closure disc 44, it seals at the face 33 with the seal ring 52, and flow is prevented through the blocked axial passages 17 when the rotor 24 is in the up position illustrated in FIG. 1. When the rotor 24 moves downwardly, the seal system is broken whereby flow can occur through the gap 49.

As will be understood, the closure disc 44 can be raised or lowered. It is shown in the sealing and raised position in FIGS. 1 and 5. Lowering the rotor 24 breaks the seal at 49 thereby permitting the pressure in the chamber 22 to be transmitted to the opposite side of the closure disc 44 via the passage 47 in pin 46. Thus, the pressure is equalized across the closure disc 44 breaking the seal with the face 33 of the seat assembly 35; thereby freeing the closure disc 44 for easy disengagement and rotation. When disengaged, the disc 44 may be rotated 180° over to the other passage 17 so that the safety relief valve connected thereto may be serviced, if required. If additional service or repair is not required, the closure disc 44 is rotated 90° for aligning the curved conduits 26 and 30 with the passages 17 for normal operation of both safety relief valves. As will be understood, the rotor 24 can be rotated with no flow or during full flow, thereby interrupting full flow to only one of the safety relief valves at a time so that a safety relief valve is operationally connected to the pressure vessel at all time.

Referring again to FIG. 1 the mounting pin 42 will be described in greater detail. First of all, a seal about the mounting pin 42 is defined at 54. A stack of seal members is compressed by capture ring 56. The capture ring 56 is jammed downwardly by a flanged jam member 58. The jam member 58 is pulled downwardly by suitable bolts 59 which thread into the upper housing 16. A portion of the pin 42 extends above the upper housing 16 and is readily accessible.

The mounting pin 42 extends upwardly through a sleeve 60. The sleeve 60 is fixedly anchored by an inverted U-shaped mounting bracket or the like connected by suitable nuts and bolts to the upper housing 16. This clamps the sleeve 60 in location. That is, the sleeve 60 is fixed at an elevation which is specified by the U-shaped mounting clamp on it and is not able to move. In this fixed elevation, the sleeve 60 supports an external threaded sleeve 62. The sleeves 60 and 62 are threaded together as shown in FIG. 1. The sleeve 62 in turn supports an external sleeve 64 joined thereto by a set screw 65. The set screw 65 is included to lock the sleeves 62 and 64 together.

The mounting pin 42 includes a circumferential groove 66 adjacent its upper end for receiving suitable ball bearings 67 therein. The ball bearings 67 are engaged by a lock nut 68 thereabove. The sleeves 62 and 64 and the lock nut 68 form a rotatable assembly 69 which may be grasped and rotated. Rotation is accomplished at the threaded interconnection 63 between the sleeves 60 and 62. The rotatable lock assembly 69 may be rotated clockwise or counter clockwise, thereby driving the rotating components shown around the pin 42 imparting such threaded rotation through the ball bearings 67. Rotation of the rotatable assembly 69 accomplishes raising and lowering of the mounting pin 42. The mounting pin 42 serves as an axis of rotation. The pin 42 is able to travel downward slightly, it being observed that the rotor 24 terminates in a telescoping connecting between the inlet 32 of the rotor 24 and the inlet 20 of the lower body 12. Downward movement of the mounting pin 42 forces the rotor 24 downwardly, thereby breaking the seal at 49 and permitting equalizing pressure across the closure disc 44 in the manner described above. Axial displacement of the mounting pin 42 also assures clearance between the rotor 24 and the body 16 during rotation of the rotor 24.

Rotation of the assembly 69 at the top of the mounting pin 42 accomplishes an unlocking function. The numeral 70 identifies a locking lug which protrudes radially inwardly from the surrounding lower body component 12. The rotor 24 supports a collar 71 which extends partially around the lower end thereof. The collar 71 has a top face or surface 72. When the rotor 24 is forced downwardly, the top surface 72 is located below the lug 70 whereby relative rotation is permitted. The collar 71 is slotted at 74, thereby permitting the lug 70 to move relatively upwardly and downwardly in the slot 74 to assure proper alignment of the curved conduits 26 and 30, as shown in FIG. 3. A pair of stop lugs 76 are located on the rotor 24. The stop lugs 76 extend above the surface 72 of the collar 71 providing an abutment surface for limiting rotational movement of the rotor 24. A stop lug is located adjacent each end of the collar 71 and spaced therefrom defining a slot 78, thereby permitting the lug 70 to move relatively upwardly and downwardly in the slot 78. In this manner, rotational movement of the rotor 24 is limited to about 180° in either direction to bring the lug 70 into either extremity of its permitted movement. The slots 74 and 78 are positioned to assure that proper alignment of the rotor 24 relative to the passages 17 is accomplished.

The arrangement just described accomplishes vertical translation of the rotor 24, all accomplished without leakage along the pin 42, for the purpose of breaking or making the seal at the closure disc 44 and to assure clearance of the rotor 24 with the body 16 during subsequent rotation.

Operation of the apparatus 10 is accomplished by first rotating the lock assembly 69 for imparting axial movement to the mounting pin 42. Recall that the sleeve 60 is fixed in elevation so that relative rotation of the lock assembly 69 forces the mounting pin 42 downwardly or upwardly depending on the direction of rotation. Once the mounting pin 42 and thereby the rotor 24 has been moved downwardly, the lug 70 is then located above the collar 71 and is able to slide along the top surface 72 thereof. Moreover, the gap 49 is opened, permitting pressure equalization across the closure disc 44. The rotor 24 is then rotated to the desired position aligning the curved conduits 26, 28 and 30 relative to the passages 17 for communicating fluid pressure to the safety relief valves.

Alignment of the curved conduits also align the lug 70 with one of the slots 74 and 78 of the collar 71. The lock assembly 69 is again rotated to pull the rotor 24 upwardly and thereby position the lug 70 in the aligned slot 74 or 78. This locks the rotor 24 in position and prevents relative rotation of the rotor 24 within the housing chamber 22. If the rotor 24 is rotated to close one of the passages 17 as shown in FIG. 1, upward movement of the rotor 24 closes the gap at 49 and forces the closure disc 44 against the face 33 of the seat assembly 35.

The chamber 22 is pressurized by fluid pressure entering the chamber 22 through the curved conduits 26 and 30 when the rotor 24 is rotated to the position shown in FIG. 1. Pressurization of the chamber 22 forces the closure disc 44 against the seal assembly 35 and thereby perfecting a fluid tight seal at seal ring 52.

Referring now to FIG. 3, the rotor 24 is positioned so that both passages 17 are open. The safety relief valves mounted to the apparatus 10 are thus both exposed to fluid pressure of the pressure vessel for protection of the vessel in the event of overpressure. This is the normal operational position of the dual active selector valve manifold of the present disclosure.

The apparatus 10 has been described herein for use in conjunction with safety relief valves. This disclosure, however, is not limited to use solely with safety relief valves. Operation of the apparatus 10 can be performed with full fluid flow through both of the passages 17. Therefore, use of the apparatus 10 in a diverter-type application for fluid flow. Use of the apparatus 10 as a diverter valve or the like for directing fluid flow is contemplated herein and is within the scope of this disclosure.

While the foregoing is directed to the preferred embodiment of the present invention, other and further embodiments of the invention may be devised without departing from the basic scope thereof, and the scope thereof is determined by the claims which follow.

We claim:
1. A selector valve comprising:
   (a) an external manifold body;
   (b) an inlet opening into said body adapted to connect to a pressure vessel to deliver fluid flow into said body through said inlet opening;
   (c) joinder means around said inlet opening for attaching said body to the pressure vessel;
   (d) said body including at least two spaced outlet passages;
   (e) an internally located conduit having branched flow passages therethrough;
   (f) closure means supported by said conduit for selectively closing said outlet passages;
   (g) support means for supporting said conduit in alignment with said inlet opening; and
   (h) bypass valve means selectively operable to equalize pressure across said closure means, said bypass valve means including a mounting plug connecting an axially hollow mounting pin to said conduit, said axially hollow mounting pin extending through said mounting plug and having an end connected to said closure means, said mounting plug including a sealing surface for engaging said closure means and forming a seal therewith.

2. The apparatus of claim 1 wherein said outlet passages include seat means defining the inlet end of said outlet passages, said seat means sealing cooperatively with said closure means to prevent flow through said one or the other of said outlet passages.

3. The apparatus of claim 1 wherein said closure means includes a peripheral lip facing said outlet passages for sealing engagement with seat means of said outlet passages;
   (a) means loosely mounting said closure means for movement toward and away from seat means; and
   (b) said mounting means permitting said conduit to wobble to accommodate for misalignment of said closure means with said seat means.

4. The apparatus of claim 1 wherein said conduit is rotatably mounted about a mounting pin aligned as an axis of rotation supporting said conduit, said mounting pin permitting axial and rotational movement of said conduit.

5. The apparatus of claim 1 wherein said branched flow passages extend from a common inlet opening in said conduit, said branched flow passages curving outwardly for alignment with said outlet passages.

6. The apparatus of claim 5 including at least three flow passages extending from said common inlet opening in said conduit.

7. The apparatus of claim 4 wherein said conduit includes an externally mounted collar about a common inlet opening of said conduit, said collar being slotted for receiving a lug member extending inwardly from said manifold body for locking said conduit and preventing rotation thereof when said lug is received in said slot.

8. The apparatus of claim 2 further including means for moving said conduit axially within said manifold body enabling release of said closure means from said seat means.

9. The apparatus of claim 8 wherein at least two of said flow passages are aligned with said outlet passages permitting simultaneous fluid communication between the pressure vessel and pressure responsive means connected to said outlet passages.

10. The apparatus of claim 5 wherein said flow passages and said outlet passages define smoothly curving fluid flow passages for minimizing fluid pressure drop between said inlet opening and said outlet passages.

11. The apparatus of claim 1 wherein downward movement of said conduit disengages said sealing surface from said closure means establishing fluid communication past said sealing surface and through said axially hollow mounting pin to said outlet passages.

12. A selector valve comprising:
   (a) an external manifold body having at least two outlet passages extending through said manifold body;
   (b) an inlet opening into said manifold body adapted to connect to a pressure vessel to deliver fluid flow into said body through said inlet opening;
   (c) joinder means around said inlet opening for attaching said body to the pressure vessel;
   (d) an internally located, rotatably mounted conduit rotatably supported in said manifold body;
   (e) closure means supported by and rotatable jointly with said conduit to a closing relationship with said outlet passages;
   (f) support means for supporting said conduit for rotation about an axis aligned with said inlet opening to maintain said conduit aligned with said inlet opening during rotation of said conduit; and
   (g) bypass valve means selectively operable to equalize pressure across said closure means, said bypass valve means including a mounting plug connecting an axially hollow mounting pin to said conduit, said axially hollow mounting pin extending through said mounting plug and having an end connected to said closure means, said mounting plug including a sealing surface for engaging said closure means and forming a seal therewith.

13. The apparatus of claim 12 including a mounting pin aligned as an axis of rotation supporting said conduit, said mounting pin permitting rotational and axial movement of said conduit.

14. The apparatus of claim 13 wherein said mounting pin includes a seal thereabout having means securing said seal around said pin and further including an externally located protruding pin portion adapted to be externally engaged to jointly rotate said pin and said conduit.

15. The apparatus of claim 14 wherein said outlet passages include seat means defining the inlet end of said outlet passages, said seat means sealing cooperatively with said closure means to prevent flow through said one or the other of said outlet passages.

16. The apparatus of claim 12 wherein said closure means includes a peripheral lip facing said outlet passages for sealing engagement with seat means of said outlet passages;
   (a) means loosely mounting said closure means for movement toward and away from said seat means; and
   (b) said mounting means permitting said conduit to wobble to accommodate for misalignment of said closure means with said seat means.

17. The apparatus of claim 12 further including means for moving said conduit axially along the axis of rotation enabling release of said closure means from said seat means.

18. The apparatus of claim 12 wherein said conduit and said outlet passages define a smoothly curving fluid flow passage for minimizing fluid pressure drop between said inlet opening and said outlet passages.

19. The apparatus of claim 12 wherein downward movement of said conduit disengages said sealing surface from said closure means establishing fluid communication past said sealing surface and through said axially hollow mounting pin to said outlet passages.

20. A selector valve comprising:
(a) an external manifold body;
(b) an inlet opening into said body adapted to connect to a pressure vessel to deliver fluid pressure into said body through said inlet opening;
(c) joinder means around said inlet opening for attaching said body to the pressure vessel;
(d) said body further incorporating a hollow upstanding external housing member closed over by a fixed upper housing member;
(e) a pair of spaced outlet passages in said fixed upper housing member;
(f) an internally located, rotatably mounted conduit having branched flow passages therethrough;
(g) closure means supported by and rotatably jointly with said conduit, said closure means including a closure disk facing said outlet passages for sealing engagement with seat means defining inlet ends of said outlet passages, and further including means loosely mounting said closure disk to said conduit for movement toward and away from said seat means, said mounting means permitting said closure disk to wobble to accommodate for slight misalignment of said closure disk with said inlet ends of said outlet passages;
(h) support means supporting said conduit for rotation about an axis aligned with said inlet opening during rotation of said conduit;
(i) said closure means further including bypass valve means selectively operable to equalize pressure across said closure disk, said bypass valve means including seal means forming a seal between said closure disk and said conduit wherein downward movement of said conduit disengages said seal means establishing fluid communication past said mounting means along a passage extending through said closure disk to said outlet passages;
(j) means for moving said conduit axially within said manifold body enabling release of said closure means from said seat means; and
(k) wherein said branched flow passages and said outlet passages upon alignment define smoothly curving fluid flow passages for minimizing fluid pressure drop between said inlet opening and said outlet passages.

21. The apparatus of claim 20 including seal means joining said external housing member and said fixed upper housing member to define a pressure tight chamber around said conduit.

22. The apparatus of claim 20 including a mounting pin aligned as an axis of rotation supporting said conduit, said mounting pin permitting rotational and axial movement of said conduit.

23. The apparatus of claim 20 wherein said fixed upper housing member closes over said hollow external housing member to define a pressure tight chamber therewithin,
(a) said fixed upper housing member supporting a mounting pin aligned with the axis of rotation of said conduit and supporting said conduit and said closure means; and
(b) said pin including a seal thereabout having means securing said seal around said pin and further including an externally located protruding pin portion adapted to be externally engaged to rotate said pin.

24. The apparatus of claim 20 wherein said flow passages extend from a common inlet opening in said conduit, said flow passages curving outwardly for alignment with said outlet passages in said fixed upper housing member.

25. The apparatus of claim 24 including at least three flow passages extending from said common inlet opening in said conduit.

26. The apparatus of claim 20 wherein said conduit includes an externally mounted collar about a common inlet opening of said conduit, said collar being slotted for receiving a lug member extending inwardly from said upstanding external housing member for locking said conduit and preventing rotation thereof when said lug is received in said slot.

27. The apparatus of claim 25 wherein at least two of said flow passages are aligned with said outlet passages permitting fluid communication simultaneously between the pressure vessel and at least two of said outlet passages.

* * * * *

UNITED STATES PATENT AND TRADEMARK OFFICE
CERTIFICATE OF CORRECTION

PATENT NO. : 4,821,772

DATED : Apr. 18, 1989

INVENTOR(S) : William L. Anderson, JR., et al.

It is certified that error appears in the above-identified patent and that said Letters Patent is hereby corrected as shown below:

On the title page, item [75] Inventors:

should read -- William L. Anderson, JR.; Larry A. Sample; and Walter W. Powell, all of Houston, Tex.--.

Signed and Sealed this

Twenty-eighth Day of November 1989

Attest:

JEFFREY M. SAMUELS

*Attesting Officer*  *Acting Commissioner of Patents and Trademarks*